(12) United States Patent
Yang et al.

(10) Patent No.: US 9,457,963 B2
(45) Date of Patent: Oct. 4, 2016

(54) TURNOVER APPARATUS

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Ming-Lu Yang, New Taipei (TW); Xiang-Tao Zhang, Jiashan (CN); Chun-Sun Liu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 91 days.

(21) Appl. No.: 14/517,126

(22) Filed: Oct. 17, 2014

(65) Prior Publication Data
US 2015/0118002 A1    Apr. 30, 2015

(30) Foreign Application Priority Data
Oct. 28, 2013 (CN) ............ 2013 2 0667006 U

(51) Int. Cl.
*B65H 15/00*    (2006.01)
*B65G 47/22*    (2006.01)
*B65G 47/252*   (2006.01)

(52) U.S. Cl.
CPC ........... *B65G 47/252* (2013.01); *B65G 47/22* (2013.01)

(58) Field of Classification Search
CPC .............. B65G 47/252; B65G 49/061; B65G 2205/00; B65G 2811/0626; C12M 23/50
USPC ........ 198/402, 403; 414/754, 758, 759, 762, 414/763, 765, 69, 771, 773, 774, 779, 783, 414/936, 941
See application file for complete search history.

(56) References Cited

U.S. PATENT DOCUMENTS

| | | | | |
|---|---|---|---|---|
| 4,573,863 A | * | 3/1986 | Picotte | B65G 47/252 198/403 |
| 5,421,889 A | * | 6/1995 | Pollock | C23C 16/54 118/719 |
| 5,609,717 A | * | 3/1997 | Pascale | E06B 3/67365 156/109 |
| 7,322,787 B2 | * | 1/2008 | Hashimoto | H01L 21/68707 414/754 |
| 7,695,239 B2 | * | 4/2010 | Wu | H01L 21/67766 294/119.1 |
| 7,878,213 B2 | * | 2/2011 | Mitsuyoshi | B65G 49/061 134/133 |
| 8,061,959 B2 | * | 11/2011 | Fan | H05K 13/0061 414/759 |
| 2010/0172735 A1 | * | 7/2010 | Gupta | C12M 23/50 414/768 |

FOREIGN PATENT DOCUMENTS

JP   60228345 A   * 11/1985
JP   02225225 A   *  9/1990

* cited by examiner

*Primary Examiner* — Gregory Adams
(74) *Attorney, Agent, or Firm* — Zhigang Ma

(57) ABSTRACT

A turnover apparatus for turning over a workpiece includes a first support frame, a second support frame, and a workpiece turnover mechanism. The workpiece turnover mechanism includes a lifting assembly and a turnover assembly. The lifting assembly includes a first driving element, a movable gripper driven by the first driving element, and a suction cup positioned on the movable gripper. The turnover assembly includes a first rotating driver, a clamp connected to the first rotating driver, and a first clamp driver. The first rotating driver is capable of rotating the first clamp driver and the clamp. The first clamp driver is capable of driving the clamp to clamp or release from the workpiece.

17 Claims, 6 Drawing Sheets

TURNOVER APPARATUS

FIELD

The subject matter herein generally relates to turnover apparatuses.

BACKGROUND

In manufacturing, when machining workpieces, an apparatus is needed to turnover the workpieces for a next process of the workpieces.

BRIEF DESCRIPTION OF THE DRAWINGS

Implementations of the present technology will now be described, by way of example only, with reference to the attached figures.

DETAILED DESCRIPTION

Figure 1:
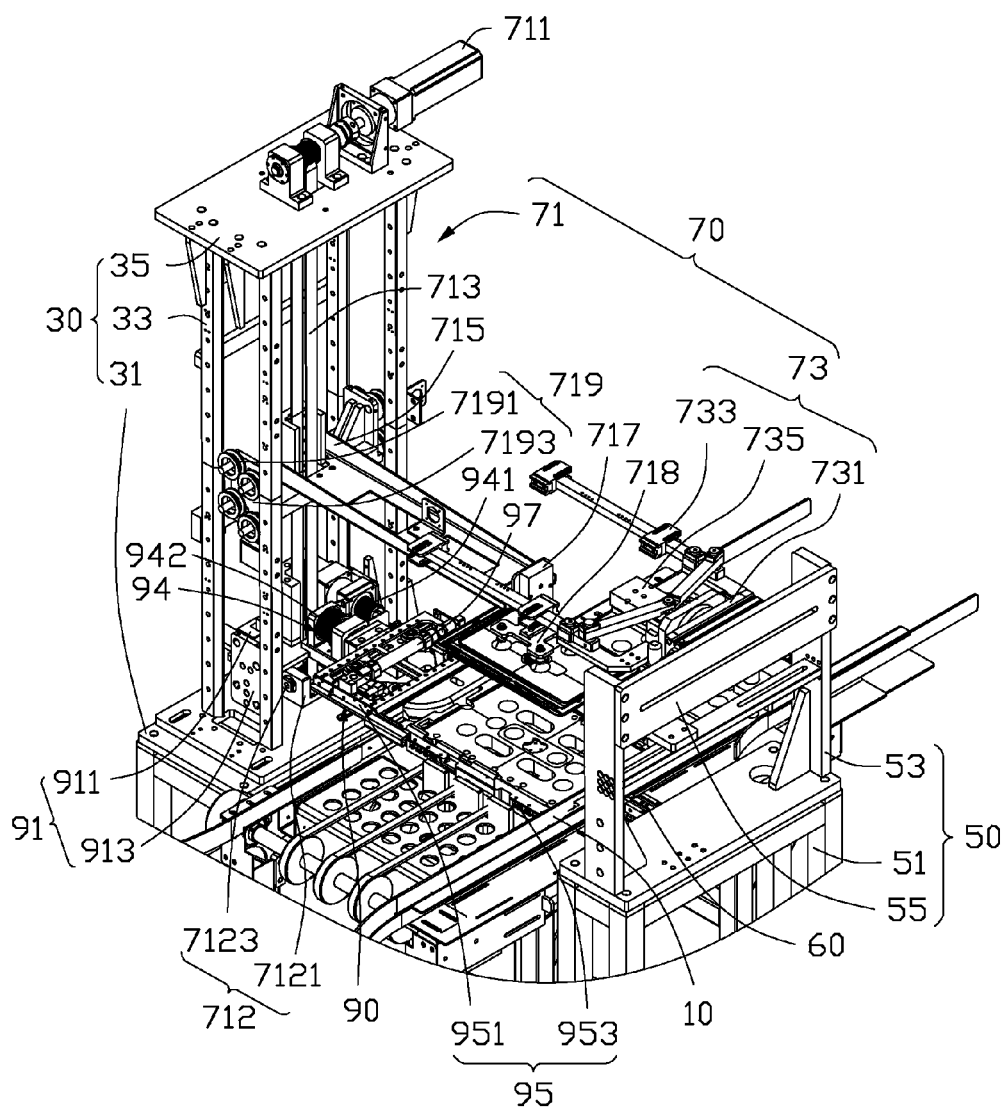
FIG. 1 is an isometric view of a turnover apparatus according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a turnover apparatus.

Figure 2:
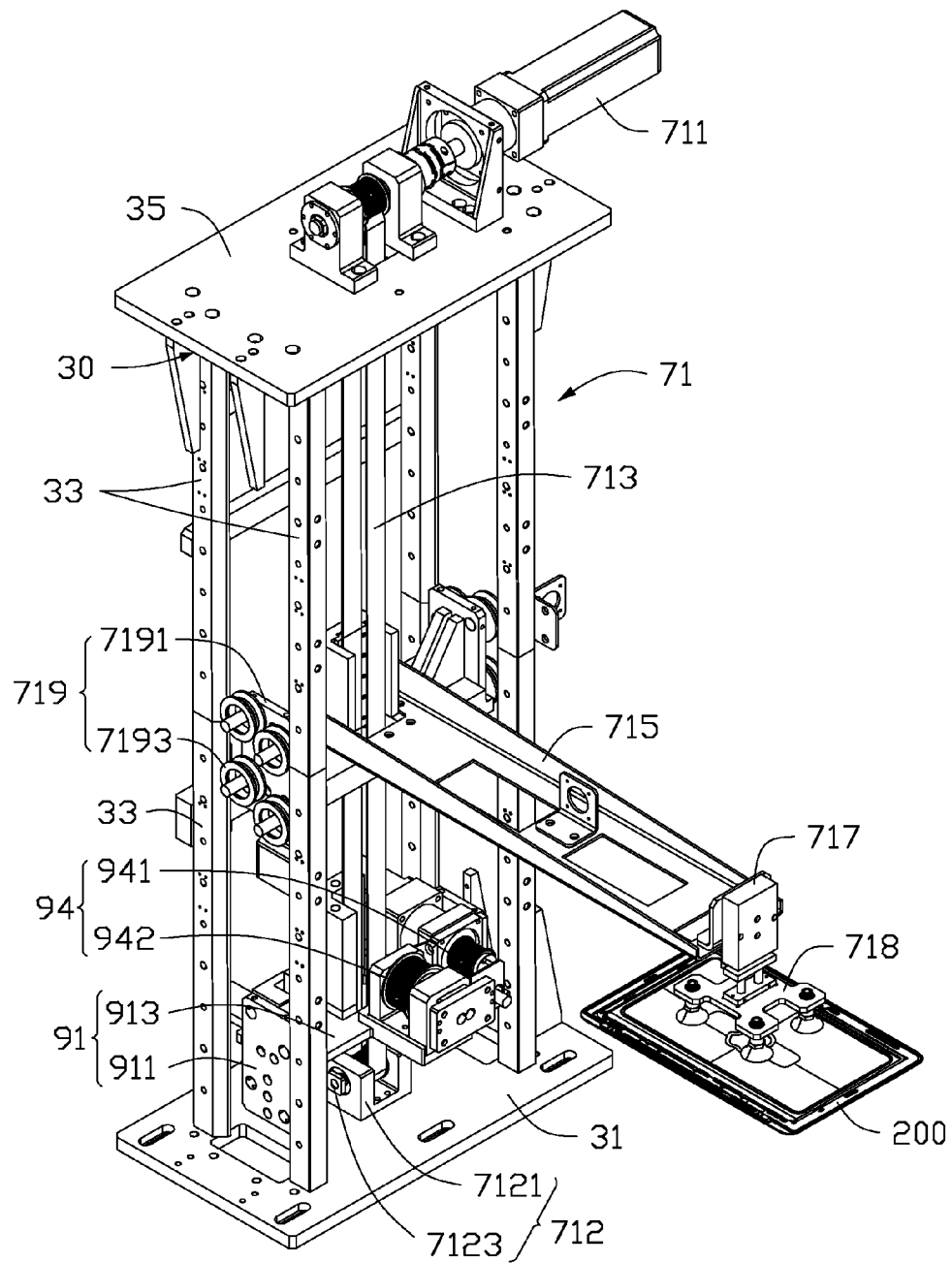
FIG. 2 is an isometric view of a first support frame and a lifting assembly of the turnover apparatus of FIG. 1.
Figure 3:
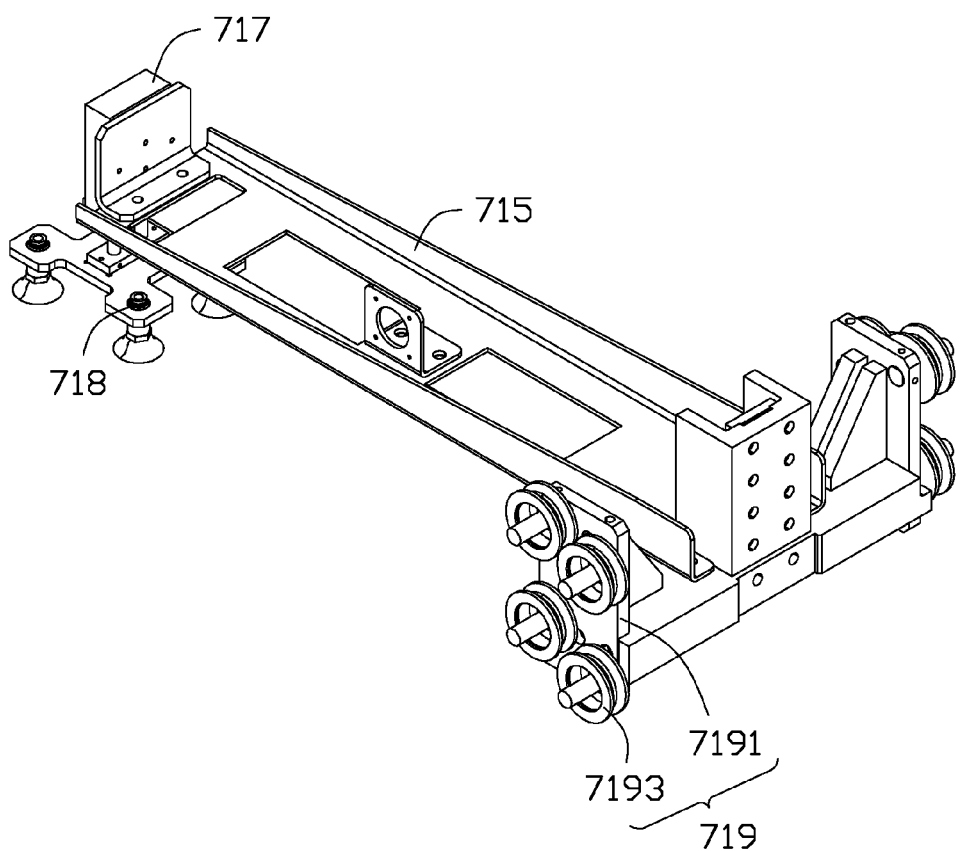
FIG. 3 is an isometric view of the lifting assembly of the turnover apparatus of FIG. 1.

FIGS. 1-3 illustrate a turnover apparatus 100 according to an embodiment of the present disclosure. The turnover apparatus 100 can include a conveying mechanism 10, a first support frame 30, a second support frame 50; a stopping block 60, a workpiece turnover mechanism 70, and a carrier turnover mechanism 90. The first support frame 30 and the second support frame 50 can be positioned facing each other and can be spaced from each other. The conveying mechanism 10 can be configured to carry a workpiece 200. The conveying mechanism 10 can be installed between the first support frame 30 and the second support frame 50. In one embodiment, the conveying mechanism 10 can be a conveyer belt. The stopping block 60 can be installed on the second support frame 50 adjacent to the conveying mechanism 10. The workpiece turnover mechanism 70 can be installed on the first support frame 30 and the second support frame 50 and can be configured to turn over the workpiece 200. The carrier turnover mechanism 90 can be installed on the first support frame 30 under the turnover mechanism 70.

The first support frame 30 can include a first base 31, four guiding shafts 33, and a support plate 35. The four guiding shafts 33 can be substantially perpendicularly installed on the support plate 35. The four guiding shafts 33 can be spaced from each other and can be substantially parallel with each other. The support plate 35 can be substantially rectangular. The support plate 35 and the first base 31 can be connected to the opposite ends of the four guiding shafts 33. The support plate 35 can be substantially parallel with the first base 31 and located on opposite ends of the guiding shafts 33.

The second support frame 50 can include a second base 51, two fastening plates 53, and a connecting plate 55. The two fastening plates 53 can be parallel with each other and can be substantially perpendicularly installed on the second base 51. The connecting plate 55 can be substantially perpendicularly connected to an end of the two fastening plates 53 away from the second base 51.

The stopping block 60 can be installed on the second base 51 and can be adjacent to the conveying mechanism 10. The stopping block 60 can be located between the second support frame 50 and the conveying mechanism 10. In one embodiment, the stopping block 60 can be an air cylinder.

The workpiece turnover mechanism 70 can include a lifting assembly 71 and a turnover assembly 73. The lifting assembly 71 can be installed on the first support frame 30. The lifting assembly 71 can include a first driving element 711, a fastening element 712, a conveyer belt 713; a movable gripper 715, a second driving element 717, a suction cup 718, and a guiding portion 719. The first driving element 711 can be installed on the support plate 35. The fastening element 712 can be installed on the first base 31 and can be located between the four guiding shafts 33.

The fastening element 712 can include an installation portion 7121 installed on the first base 31 and a rotating shaft 7123 rotatably passing through the installation portion 7121. In one embodiment, the installation portion 7121 can be substantially U-shaped. The rotating shaft 7123 can be substantially perpendicular to the guiding shaft 33 and parallel with the support plate 35. One end of the conveyer belt 713 near the first driving element 711 can pass through the support plate 35 and can be coiled on one end of the first driving element 711. Another end of the conveyer belt 713 away from the first driving element 711 can be coiled on the rotating shaft 7123. The conveyer belt 713 can be located between the first base 31 and the support plate 35, and can be substantially parallel with the guiding shafts 33. The conveyer belt 713 can be moved by the first driving element 711 in a first direction substantially perpendicular to the first base 31.

The movable gripper 715 can move with the conveyer belt 713 in the first direction. One end of the movable gripper 715 adjacent to the first support frame 30 can be connected to the conveyer belt 713. Another end of the movable gripper 715 away from the first support frame 30 can extend to the second support frame 50. The second driving element 717 can be installed on the end of the movable gripper 715 away from the first support frame 30. The suction cup 718 can be installed on the second driving element 717 and can be positioned facing the conveying mechanism 10. The second driving element 717 can be configured to drive the suction cup 718 to move in the first direction near the conveying mechanism 10. The suction cup 718 can be configured to suction to or release the workpiece 200 on the conveying mechanism 10.

The guiding portion 719 can be fastened on an end of the movable gripper 715 adjacent to the guiding shaft 33 and can move with the conveyer belt 713 along the guiding shaft 33. The guiding portion 719 can include a pair of guiding plates 7191 parallel with and facing each other, and eight guiding wheels 7193 installed on the guiding plates 7191. Four of the eight guiding wheels 7193 can be installed on one of the guiding plates 7191, and remaining four guiding wheels 7193 can be installed on the other guiding plate 7191. The pair of guiding plates 7191 can be installed on the end of the movable gripper 715 adjacent to the guiding shaft 33 and can be located on opposite sides of the movable gripper 715. The eight guiding wheels 7193 can cooperatively move with the movable gripper 715 along the guiding shafts 33. In other embodiments, the guiding wheels 7193 can be an even number and can have more than two.

The carrier turnover mechanism 90 can include a connecting element 91, a second rotating driver 94, a clamping assembly 95, and a second clamp driver 97. The connecting element 91 can be installed on the first base 31 and can be located above the fastening element 712. The connecting element 91 can include a pair of slide portions 911 substantially perpendicular to the first base 31 and a bearing plate 913 installed on each slide portion 911. The conveyer belt 713 can pass through the bearing plate 913 allowing the conveyer belt 713 to be coiled on the rotating shaft 7123. In one embodiment, the conveyer belt 713 can pass through a slot defined on the bearing plate 913. The slide portion 911 can be substantially parallel with the guiding shaft 33 and opposite sides of the slide portion 911 can abut against two guiding shafts 33. The bearing plate 913 and the slide portion 911 can cooperatively form a U-shape structure.

The second rotating driver 94 can be installed on the bearing plate 913. The second rotating driver 94 can include a fourth driving element 941 and a conveying element 942. The fourth driving element 941 and conveying element 942 can be distanced from each other and located on the bearing plate 913. In one embodiment, the fourth driving element 941 can be a motor and can be connected to the conveying element 942 by a conveyer belt.

The clamping assembly 95 can include a clamping base 951 connected to the conveying element 942 and a pair of clamping manipulators 953 installed on opposite sides of the clamping base 951. The fourth driving element 941 can drive the conveying element 942 to rotate. The conveying element 942 can drive the clamping assembly 95 to turnover 180 degrees.

The second clamp driver 97 can be installed on the clamping base 951 and can be substantially perpendicularly connected to the clamping manipulators 953. The clamping manipulators 953 can be moved to be near or away from each other to clamp or release the carrier 300, driven by the second clamp driver 97.

In other embodiments, the second rotating driver 94 can be a rotating cylinder configured to drive the carrier 300 to turnover.

Figure 4:
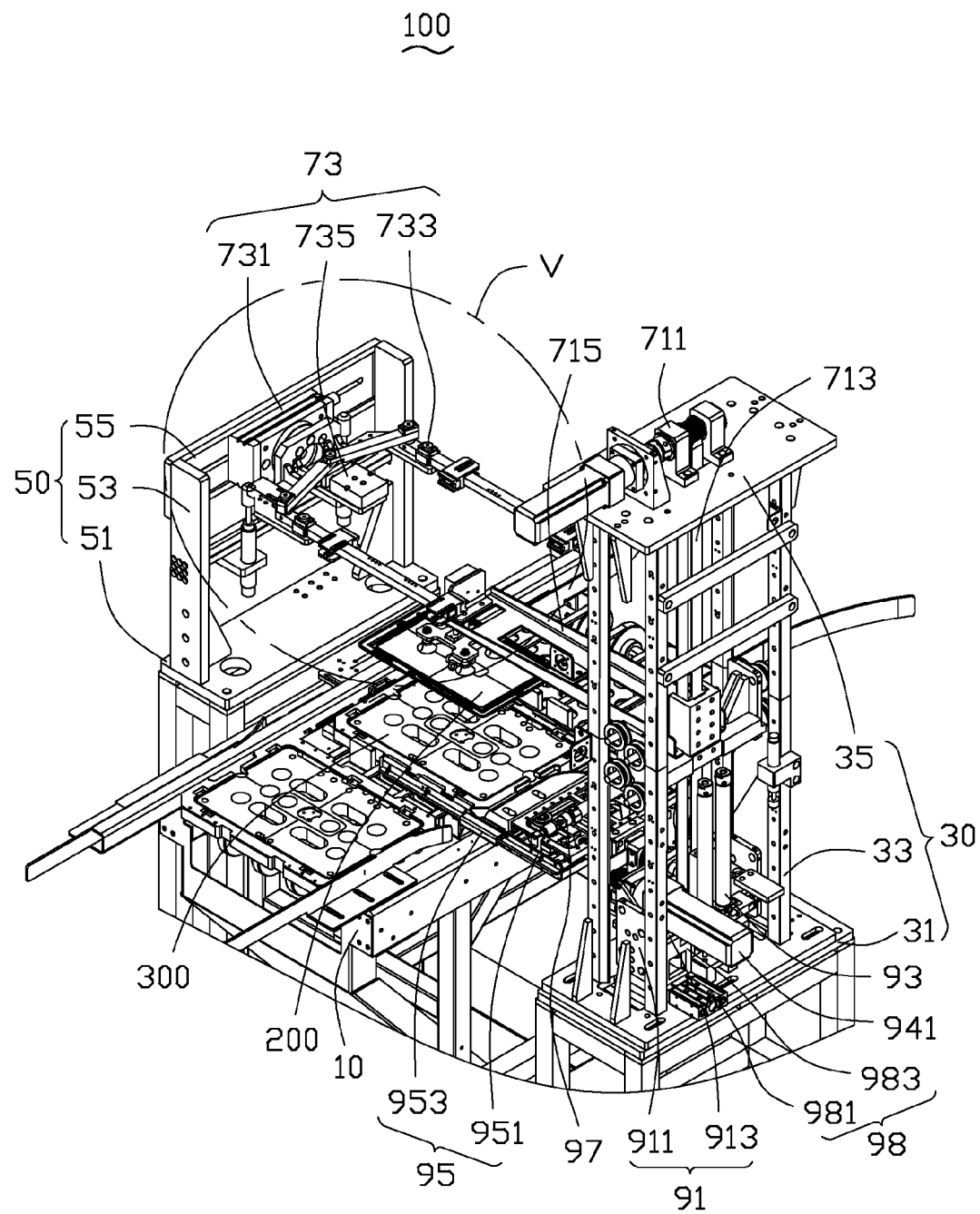
FIG. 4 is an isometric view of the turnover apparatus of FIG. 1 from another angle.
Figure 5:
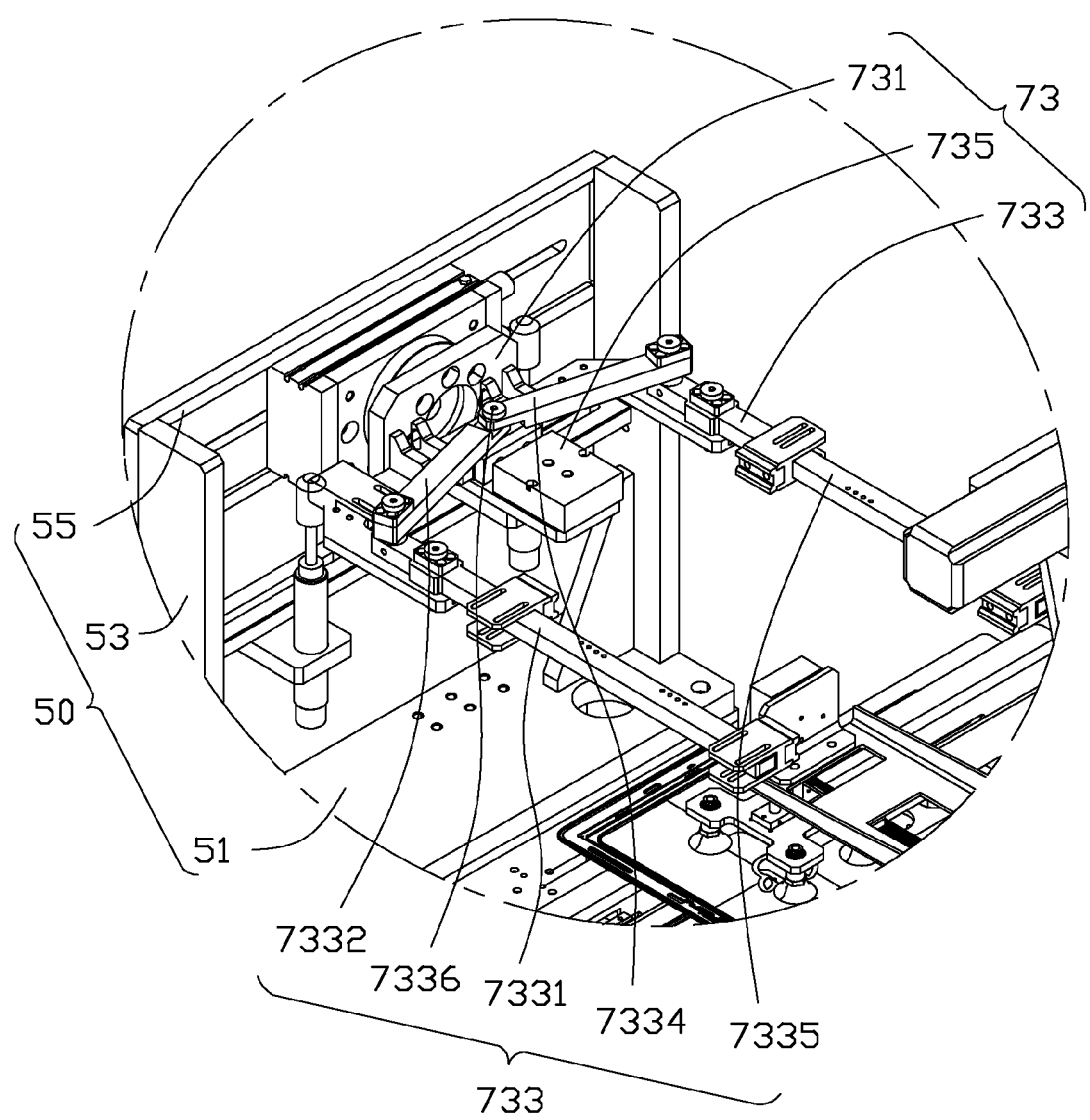
FIG. 5 is an enlarged view of a circled portion V of the turnover apparatus of FIG. 4.
Figure 6:
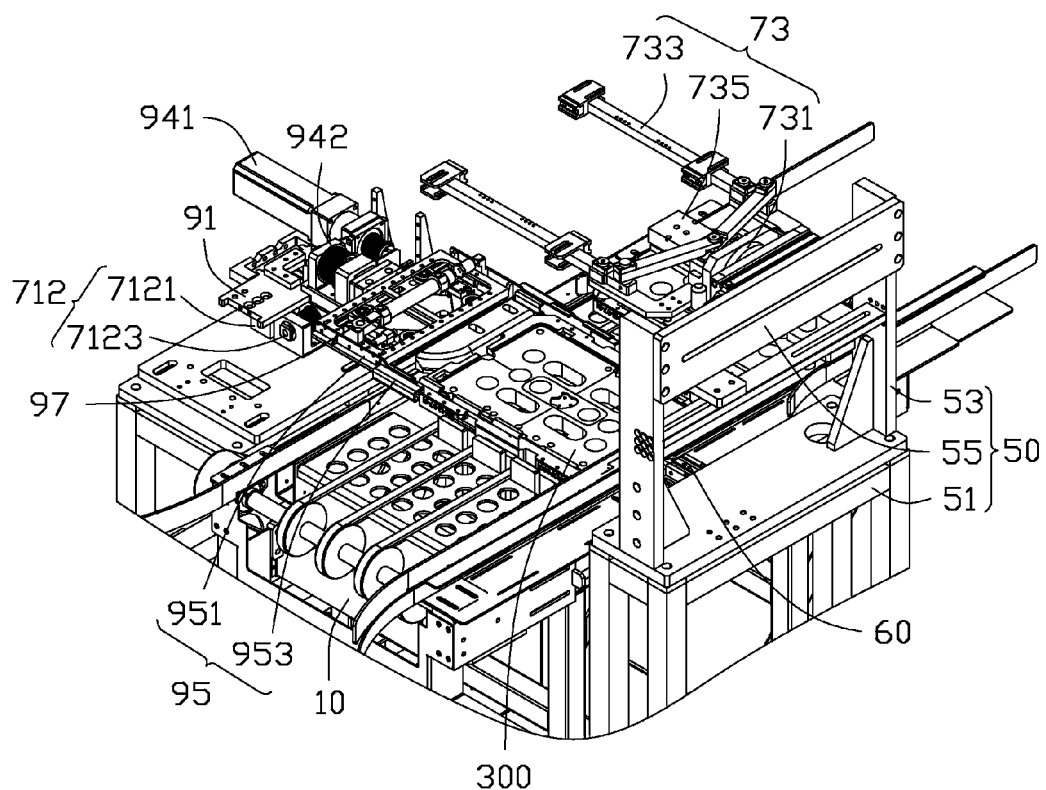
FIG. 6 is an isometric view of the turnover apparatus of FIG. 1 without the lifting assembly and the first support frame.

FIG. 4-6 illustrate that the turnover assembly 73 can be installed on the second support frame 50 and can be positioned facing the conveyer belt 713. The turnover assembly 73 can include a first rotating driver 731, a clamp 733, and a first clamp driver 735. The first rotating driver 731 can be installed on one side of the connecting plate 55 facing the conveyer belt 713. The clamp 733 can be connected to the first rotating driver 731 and can rotate with the first rotating driver 731. The clamp 733 can include a first rod 7331, a second rod 7332 fastened to the first rod 7331, a third rod 7334 connected to the second rod 7332, and a fourth rod 7335 fastened to the third rod 7334. The clamp 733 can further include a connecting shaft 7336 located in a joint of the second rod 7332 and third rod 7334. The second rod 7332 and third rod 7334 can be connected to the first rotating driver 731 by the connecting shaft 7336. The first rod 7331 and the fourth rod 7335 can be substantially parallel with each other.

The first clamp driver 735 can be connected to the first rotating driver 731 and can be positioned facing the connecting shaft 7336. The first clamp driver 735 can be fixedly connected to the second rod 7332 and the third rod 7334. The second rod 7332 and the third rod 7334 can rotate around the connecting shaft 7336 to drive the first rod 7331 and fourth rod 7335 to clamp or loosen the workpiece 200. The first rotating driver 731 can drive the clamp 733 to rotate 180 degrees, allowing that the workpiece 200 clamped by the clamp 733 can be turned over 180 degrees.

The carrier 300 can be configured to load the workpiece 200 and can be carried by the conveying mechanism 10. The stopping block 60 can be configured to stop the carrier 300 and the conveying mechanism 10 from moving. The carrier 300 can be turned over 180 degrees by the clamping assembly 95.

The carrier turnover mechanism 90 can further include a third driving element 93 and a protecting element 98. The third driving element 93 can be installed on the bearing plate 913 and can be positioned parallel with the conveyer belt 713. In one embodiment, the third driving element 93 can be two pen-shaped cylinders. The third driving element 93 can drive the connecting element 91 to move in the first direction substantially perpendicular to the first base 31. When the clamping manipulators 953 are moved together to clamp the carrier 300, the third driving element 93 can move the carrier turnover mechanism 90 in the first direction. The protecting element 98 can be installed on the first base 31, and can include a driving portion 981 and a restricting portion 983 perpendicularly positioned on the driving portion 981. The protecting element 98 can be configured to prevent damage to the turnover apparatus 100 from a power short for example.

In assembly, the first support frame 30 and the second support frame 50 can be positioned on the opposite sides of the conveying mechanism 10. The stopping block 60 can be installed on the second support frame 50. The carrier turnover mechanism 90 can be positioned on the first base 31 and the lifting assembly 71 can be positioned on the first support frame 30. The turnover assembly 73 can be installed on the second support frame 50.

In use, when the conveying mechanism 10 carries the carrier 300 the workpiece 200 is loaded to a section facing the suction cup 718, the stopping block 60 extends to the carrier 300 to stop the workpiece 200 from moving. After the carrier 300 loading the workpiece 200 stops, the stopping block 60 can withdraw to a prior section. Then, the movable gripper 715 can be perpendicularly moved down by the first driving element 711 until the suction cup 718 can suction to the workpiece 200.

After the suction cup 718 suctions to the workpiece 200, the movable gripper 715 can be moved perpendicularly up by the first driving element 711 until the movable gripper 715 is near to the clamps 733 of the turnover assembly 73. The clamps 733 can clamp the workpiece 200, and the suction cup 718 can release the workpiece 200. Then, the movable gripper 715 can be moved perpendicularly up by the first driving element 711 to a first predetermined height. The first rotating driver 731 can turnover the clamps 733 which can turn over the workpiece 200 180 degrees. At the same time, the clamping manipulators 953 of the clamping assembly 95 can clamp the carrier 300 driven by the second clamp driver 97. The carrier turnover mechanism 90 can be moved up to a second predetermined height along the guiding shafts 33 by the third driving element 93. The clamping assembly 95 can turn over the carrier 300 driven by the second rotating driver 94.

Then, the third driving element 93 can drive the clamping assembly 95 to move the clamped carrier 300 down to the conveying mechanism 10. The clamping assembly 95 can release the clamped carrier 300 and can withdraw to a second prior section driven by the third driving element 93. The movable gripper 715 can move down near the turnover assembly 73. The suction cup 718 can suction to the overturned workpiece 200. At the same time, the clamp 733 can release the workpiece 200. Then, the suction cup 718 and the workpiece 200 can be moved downward to the carrier 300. When the workpiece 200 is near the carrier 300, the suction cup 718 can release the workpiece 200 and the workpiece 200 can be positioned on the carrier 300. Thus, the workpiece 200 and the carrier 300 can be both turned over 180 degrees. The conveying mechanism 10 can be activated, and the workpiece 200 and carrier 300 can be carried by the conveying mechanism 10 to a next process.

The turnover apparatus 100 can have a lifting assembly 71 and a turnover assembly 73 to turn over the workpiece 200; a carrier turnover mechanism 90 to turn over the carrier 300, a conveying mechanism 10 to carry the overturned workpiece 100 and carrier 300 to the next process, therefore processing efficiency can be improved and labor cost can be reduced by automation.

In other embodiments, the carrier turnover mechanism 90 can be emitted.

In other embodiments, the conveyer belt 713 can be emitted, and the movable gripper 715 can be directly connected to the first driving element 711. The first driving element 711 can be a cylinder configured to drive the movable gripper 715 to move up and down.

In other embodiments, the guiding portion 719 can be emitted, as long as the movable gripper 715 can be moved steadily.

In other embodiments, the stopping block 60 can be emitted. For example, the conveying mechanism 10 can be automatically stopped from moving, when the carrier 300 carried by the conveying mechanism 10 arrives at the carrier turnover mechanism 90.

In other embodiments, the conveying mechanism 10 can be emitted. For example, the workpiece 200 can be directly placed under the suction cup 718.

The embodiments shown and described above are only examples. Many details are often found in the art such as the other features of a turnover apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An apparatus for turning over a workpiece, the apparatus comprising:
    a first support frame;
    a second support frame;
    a lifting assembly comprising:
        a first driving element positioned on the first support frame;
        a movable gripper driven by the first driving element;
        a suction cup positioned on the movable gripper; and
        a second driving element installed on an end of the movable gripper away from the first support frame and connected to the suction cup; and
    a turnover assembly, the turnover assembly comprising:
        a first rotating driver installed on the second support frame;
        a clamp connected to the first rotating driver; and
        a first clamp driver connected to the first rotating driver and the clamp;
    wherein, the suction cup is capable of being moved by the second driving element in a direction substantially perpendicular to the movable gripper;
    wherein, the first rotating driver is capable of rotating the first clamp driver and the clamp, and the first clamp driver is capable of driving the clamp to clamp or release from the workpiece.

2. The turnover apparatus as claimed in claim 1, wherein the clamp includes:
    a first rod;
    a second rod fastened to the first rod;
    a third rod connected to the second rod;
    a fourth rod fastened to the third rod, the fourth rod positioned substantially parallel with the first rod; and
    a connecting shaft configured to connect the second rod and the third rod to the first rotating driver.

3. The turnover apparatus as claimed in claim 1, wherein the first support frame includes:
    a first base;
    four guiding shafts substantially perpendicularly installed on the first base and distanced from each other; and
    a supporting plate substantially perpendicularly installed on the four guiding shafts facing the first base and substantially parallel with the first base;
    wherein the first driving element is installed on the supporting plate.

4. The turnover apparatus as claimed in claim 1, wherein the second support frame includes:
    a second base;
    two fastening plates positioned on the second base parallel with each other; and a connecting plate substantially perpendicularly connected to an end of the two fastening plates away from the second base;

wherein the first rotating driver is installed on one side of the connecting plate facing the conveyer belt.

5. The turnover apparatus as claimed in claim 1, wherein the turnover apparatus further includes:
a conveying mechanism positioned between the first support frame and the second support frame for carrying the workpiece; and
a stopping block positioned on the second support frame adjacent to the conveying mechanism, the stopping block configured to stop a moving of the workpiece.

6. The turnover apparatus as claimed in claim 3, wherein the lifting assembly includes:
a guiding portion positioned on an end of the movable gripper adjacent to the guiding shaft, the guiding portion including:
a pair of guiding plates parallel with and facing each other, and
at least two guiding wheels of an even number installed on the guiding plates;
wherein the guiding plates are installed on the end of the movable gripper adjacent to the guiding shaft and located on opposite sides of the movable gripper, and the guiding plates are capable of cooperatively moving with the movable gripper along the guiding shafts.

7. The turnover apparatus as claimed in claim 3, wherein the lifting assembly further includes:
a conveyer belt connected to the movable gripper, the conveyer belt configured to drive the movable gripper to move in a direction substantially perpendicular to the first base; and
a fastening element installed on the first base;
wherein a first end of the conveyer belt near the first driving element passes through the supporting plate and is coiled on the first driving element, and a second end of the conveyer belt away from the first driving element is coiled on the fastening element.

8. The turnover apparatus as claimed in claim 7, wherein the fastening element includes:
an installation portion installed on the first base; and
a rotating shaft rotatably passing through the installation portion;
wherein the second end of the conveyer belt away from the first driving element is coiled on the rotating shaft.

9. The turnover apparatus as claimed in claim 1, wherein, the turnover apparatus further includes a carrier turnover mechanism installed on the first base facing workpiece turnover mechanism and configured to turn over a carrier for loading the workpiece, the carrier turnover mechanism including:
a connecting element positioned on the first support frame; and
a third driving element connected to the connecting element;
wherein the third driving element is capable of driving the connecting element to move in a direction perpendicular to the movable gripper.

10. The turnover apparatus as claimed in claim 9, wherein, the connecting element includes:
a pair of slide portions perpendicular to the first support frame;
a bearing plate installed on each slide portion; and
wherein the bearing plate and the slide portion cooperatively form a U-shape structure;

wherein, the slide portion is substantially parallel with and abuts against the first support frame.

11. The turnover apparatus as claimed in claim 9, wherein the third driving element are two pen-shaped cylinders.

12. The turnover apparatus as claimed in claim 9, wherein the carrier turnover mechanism further includes a protecting element positioned on the first support frame and configured to protect the turnover apparatus from a damage, the protecting element including:
a driving portion; and
a restricting portion positioned on the driving portion and perpendicular to the driving portion.

13. The turnover apparatus as claimed in claim 9, wherein the carrier turnover mechanism further includes:
a second rotating driver connected to the connecting element; and
a clamping assembly connected to the second rotating driver;
wherein the second rotating driver is capable of rotating the clamping assembly.

14. The turnover apparatus as claimed in claim 13, wherein the second rotating driver includes a fourth driving element and a conveying element.

15. The turnover apparatus as claimed in claim 13, wherein the clamping assembly includes a clamping base connected to the conveying element and a pair of clamping manipulators installed on opposite sides of the clamping base.

16. The turnover apparatus as claimed in claim 13, wherein the carrier turnover mechanism further includes a second clamp driver connected to the clamping assembly and the second clamp driver is capable of driving the clamping assembly to clamp or release from the carrier for loading a workpiece.

17. An apparatus or turning over a workpiece, the apparatus comprising:
a first support frame;
a second support frame;
a lifting assembly comprising:
a first driving element positioned on the first support frame;
a movable gripper driven by the first driving element; and
a suction cup positioned on the movable gripper; and
a turnover assembly, the turnover assembly comprising:
a first rotating driver installed on the second support frame;
a clamp, the clamp comprising:
a first rod;
a second rod fastened to the first rod;
a third rod connected to the second rod;
a fourth rod fastened to the third rod, the fourth rod positioned substantially parallel with the first rod; and
a connecting shaft configured to connect the second rod and the third rod to the first rotating driver; and
a first clamp driver connected to the first rotating driver, and fixedly connected to the second rod and the third rod;
wherein, the first rotating driver is capable of rotating the first clamp driver and the clamp, and the first clamp driver is capable of driving the first rod and fourth rod to clamp or release from the workpiece.

* * * * *